(No Model.)
M. MURRAY.
MIRROR ATTACHMENT FOR SPECTACLES.
No. 498,018. Patented May 23, 1893.
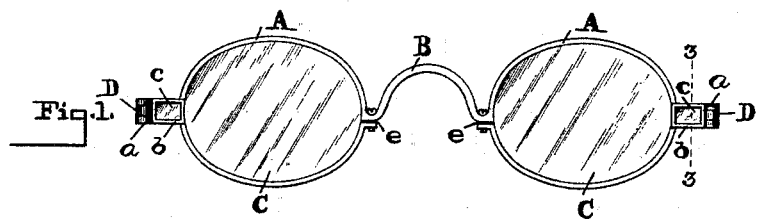
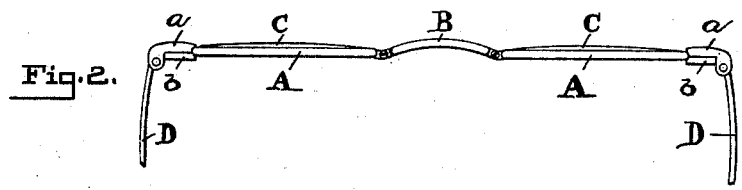
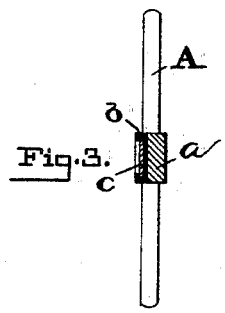
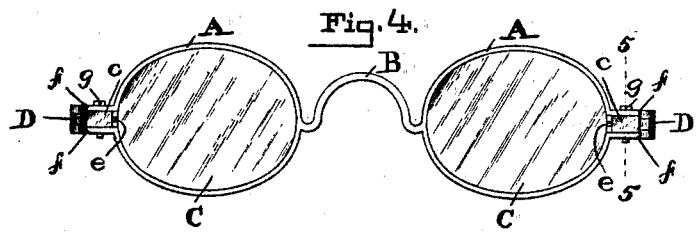 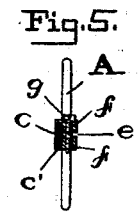
WITNESSES:
A. O. Babendreier.
F. Parker Davis.
INVENTOR:
Michael Murray.
By Chas. B. Mann
Atty

United States Patent Office.

MICHAEL MURRAY, OF BALTIMORE, MARYLAND.

MIRROR ATTACHMENT FOR SPECTACLES.

SPECIFICATION forming part of Letters Patent No. 498,018, dated May 23, 1893.

Application filed June 18, 1892. Serial No. 437,159. (No model.)

*To all whom it may concern:*

Be it known that I, MICHAEL MURRAY, a citizen of the United States, residing at Baltimore city, in the State of Maryland, have invented certain new and useful Improvements in Mirror Attachments for Spectacles, of which the following is a specification.

This invention relates to an improvement in spectacles and the object is to provide spectacles with a mirror attachment which will reflect objects behind the person wearing the spectacles into the vision of the said wearer.

The invention is illustrated in the accompanying drawings, in which—

Figure 1 shows an inside face view of a pair of spectacles having my attachment. The side-pieces or temples appear in cross-section. Fig. 2 shows a top view of the same. Fig. 3 shows an enlarged section on line 3—3 of Fig. 1. Fig. 4 shows a similar view to Fig. 1 the mirror attachment having a different construction. Fig. 5 shows a cross-section of this modified construction taken on line 5—5 of Fig. 4.

The letter, A, designates the glass-holding portions or bows of the frame of a pair of spectacles; B, the bridge connecting said bows; C, the glasses or crystals; and, D, the side-pieces or "temples."

In the construction shown in Figs. 1-3, instead of having the split, e, (which is provided for the purpose of clamping the bow on the glass) in the frame at the outside part of each glass-holding portion or bow, as in the usual construction of spectacle frames, I have the split at the inside part of each bow where it connects with the bridge, the outside portion being left solid. A flat outward-projecting arm, a, is formed at the outer part of each bow and its end is bifurcated and receives the end of the side-piece or temple D, to form the hinge in the usual way. A small, rectangular box or frame, b, containing a mirror, c, is fastened on the inner side of the arm, a, in any suitable manner, such as by solder for instance. One of these mirrors is at each side of the spectacles, and it is intended that they shall be so small as not to attract notice. The hinges joining the side-pieces and the arms of the bows of the frame project back sufficiently to avoid interference of the mirrors with the folding in of the hinged side-pieces in the usual way. It will be seen that the mirrors will reflect objects in the rear of the person wearing the spectacles so that such objects will be readily visible to such person, who has merely to cast his eye to one side. At the same time the mirror attachments do not interfere with the ordinary use of the spectacles, as said attachments are located at the side and out of the direct line of vision.

Figs. 4 and 5 illustrate a different way of attaching the mirrors. The split, e, is at the outside of the bow as usual, and the outward-projecting arm is in two parts, f,—one on each side of the split and between which the side-pieces or temples are jointed. These arms, f, are made thicker than usual and are grooved out on the inner side to form a recess, c', which receives the mirror, c; the screw, g, that clamps the bow on the crystal also clamps the mirror between the arms, f.

The advantages of this mirror attachment will be obvious.

It is evident my invention may be embodied in other forms than those here shown.

Having thus described my invention, what I claim as new, and desire to secure by Letters Patent, is—

1. Spectacles having a frame with arms projecting from the outer parts of the bows of said frame, side-pieces or temples jointed to said arms, and mirrors carried on said arms between the joints and the bows of the frame.

2. In spectacles, a frame having bows with projecting arms, side-pieces or temples jointed to said arms, and a box or frame secured to each of said arms and containing a mirror, for the purpose described.

In testimony whereof I affix my signature in the presence of two witnesses.

MICHAEL MURRAY.

Witnesses:
JNO. T. MADDOX,
F. PARKER DAVIS.